J. H. HARTH.
SEED CORN HANGER.
APPLICATION FILED JUNE 27, 1910.
988,468.
Patented Apr. 4, 1911.
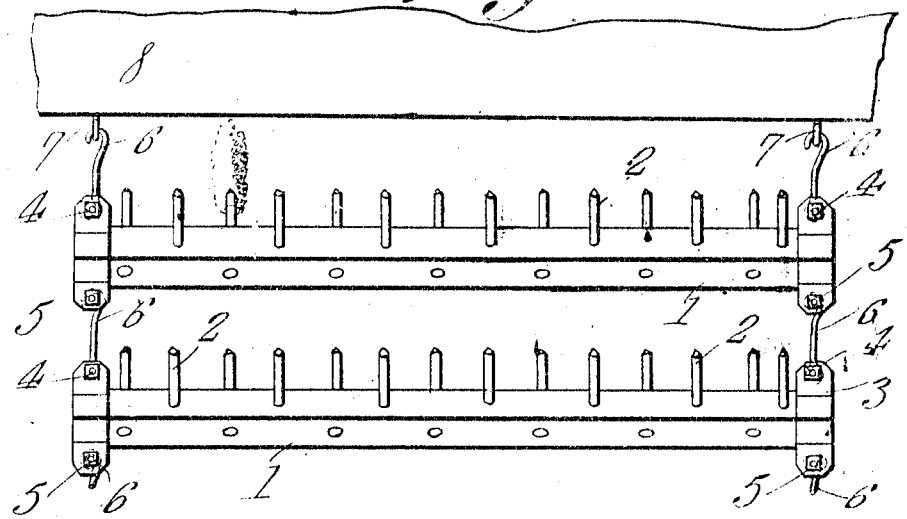
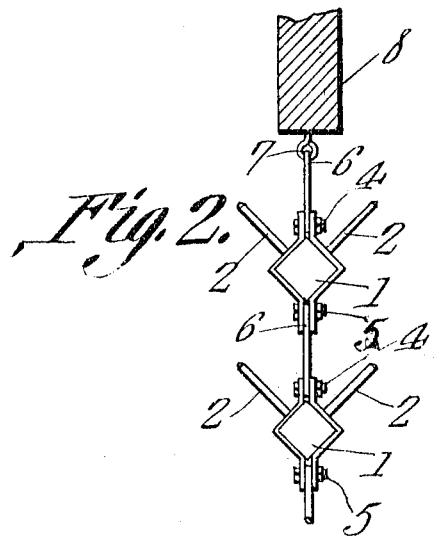
Witnesses
John H. Harth, Inventor
by Attorneys

UNITED STATES PATENT OFFICE.

JOHN H. HARTH, OF AMBIA, INDIANA.

SEED-CORN HANGER.

988,468.  Specification of Letters Patent.  Patented Apr. 4, 1911.

Application filed June 27, 1910. Serial No. 569,198.

*To all whom it may concern:*

Be it known that I, JOHN H. HARTH, a citizen of the United States, residing at Ambia, in the county of Benton and State of Indiana, have invented a new and useful Seed-Corn Hanger, of which the following is a specification.

This invention has relation to seed corn hangers especially adapted to be used in graineries and it consists in the novel construction and arrangements of its parts as hereinafter shown, described and claimed.

The object of the invention is to provide a seed corn hanger of the nature indicated which is of simple construction and which will support the ears of corn individually and in such a manner as to reduce the possibility of damage from rodents to a minimum.

In the accompanying drawings, Figure 1 is a side elevation of a seed hanger. Fig. 2 is an end elevation of the same.

The hanger consists of a bar 1 which is preferably rectangular in transverse section. Impaling pins 2 are mounted upon the bar 1 and are so arranged that each alternate pin is upwardly and outwardly disposed in one direction and the other pins are upwardly and outwardly disposed in another direction approximately at right angles to the direction in which the first said set of pins are disposed. The pins of the two sets are in staggered relation that is to say they are not opposite each other in a plane at a right angle to the long dimension of the bar. Plates 3 are located at the ends of the bar and are held against the opposite sides of the bar by means of upper clamp bolts 4 and lower clamp bolts 5. It will be seen that the said plates are arranged in pairs and the ends of the members of each pair are spaced. Hooks 6 are pivoted upon the upper clamp bolts 4 and are located between the ends of the members constituting the pairs of plates 3.

In use the ears of seed corn are stuck upon the projecting ends of the pins 2 and the hooks 6 of a bar may be engaged with eyes 7 upon a rafter or other support 8. Another bar may then be provided with ears of seed corn in the manner as indicated and the hooks of the last said bar are engaged with the clamp bolts 5 upon the plates of the first said bar. As many of the said bars as desired may be connected together in this manner and thus it will be seen that the ears of corn will be held in spaced relation and will be supported out of the way and in such position as to protect them in a great measure against the ravages of rodents and so forth.

Having described the invention what I claim as new and desire to secure by Letters Patent is:—

1. A hanger comprising a bar, impaling pins mounted upon the bar, plates bearing against the opposite sides of the bar, clamp bolts connecting the plates together and supporting hooks located between the upper ends of the plates and pivotally mounted upon the upper clamp bolts.

2. A hanger comprising a bar, impaling pins mounted thereon, plates arranged in pairs and located against the opposite sides of the bar, the members of each pair of plates having their ends spaced, clamp bolts connecting the end portions of the members of each pair of plates, supporting hooks pivotally mounted upon the upper clamp bolts and located between the ends of the plates.

In testimony that I claim the foregoing as my own, I have hereto affixed my signature in the presence of two witnesses.

JOHN H. HARTH.

Witnesses:
 WM. WILLIAMSON
 WM. SCHWARTZ.